Dec. 26, 1950  B. LYONS  2,535,146
DENTAL ARTICULATOR
Filed Jan. 11, 1949  3 Sheets-Sheet 3
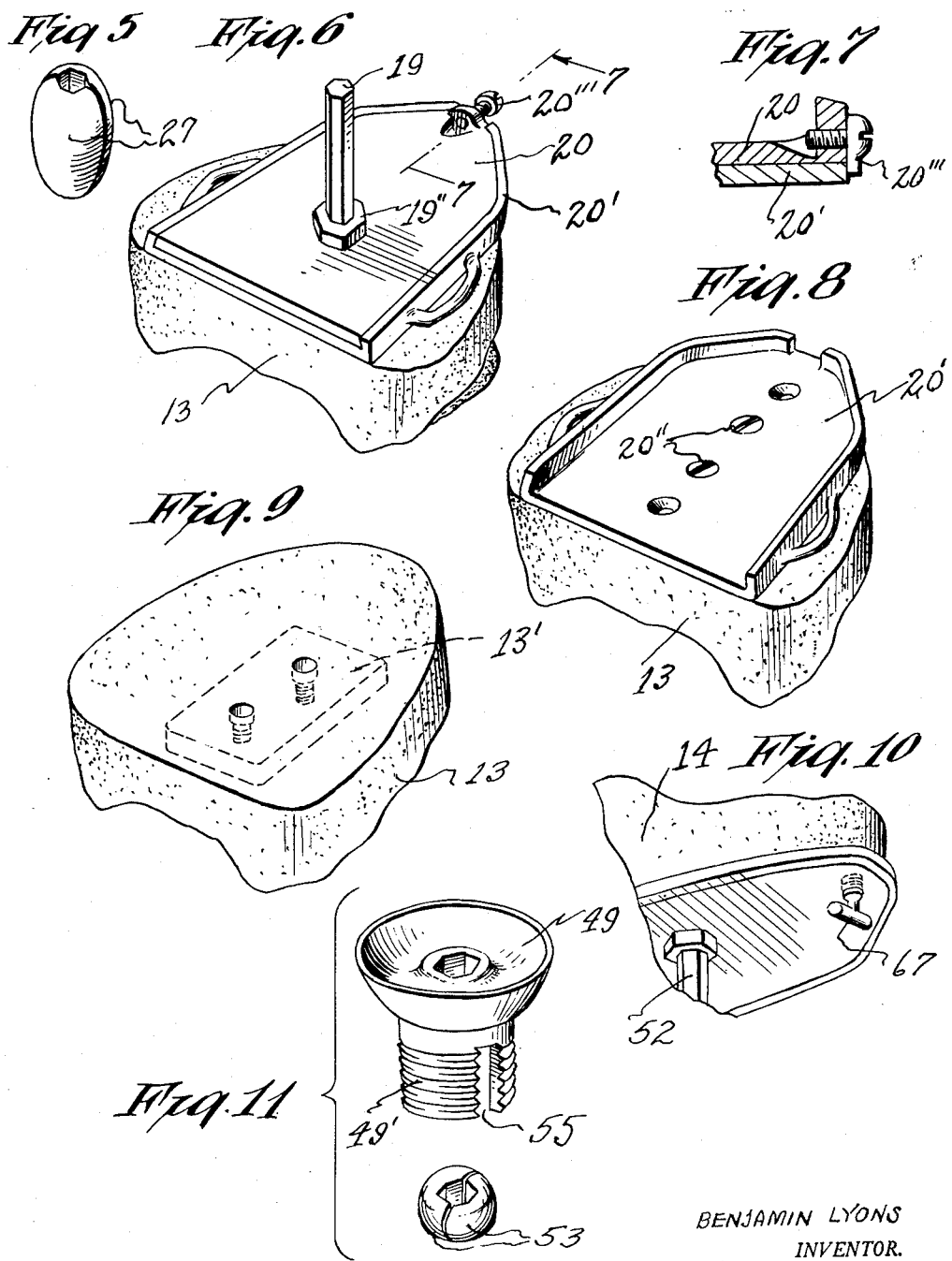
BENJAMIN LYONS
INVENTOR.
BY Alexander Meucher
ATTORNEY Patented Dec. 26, 1950

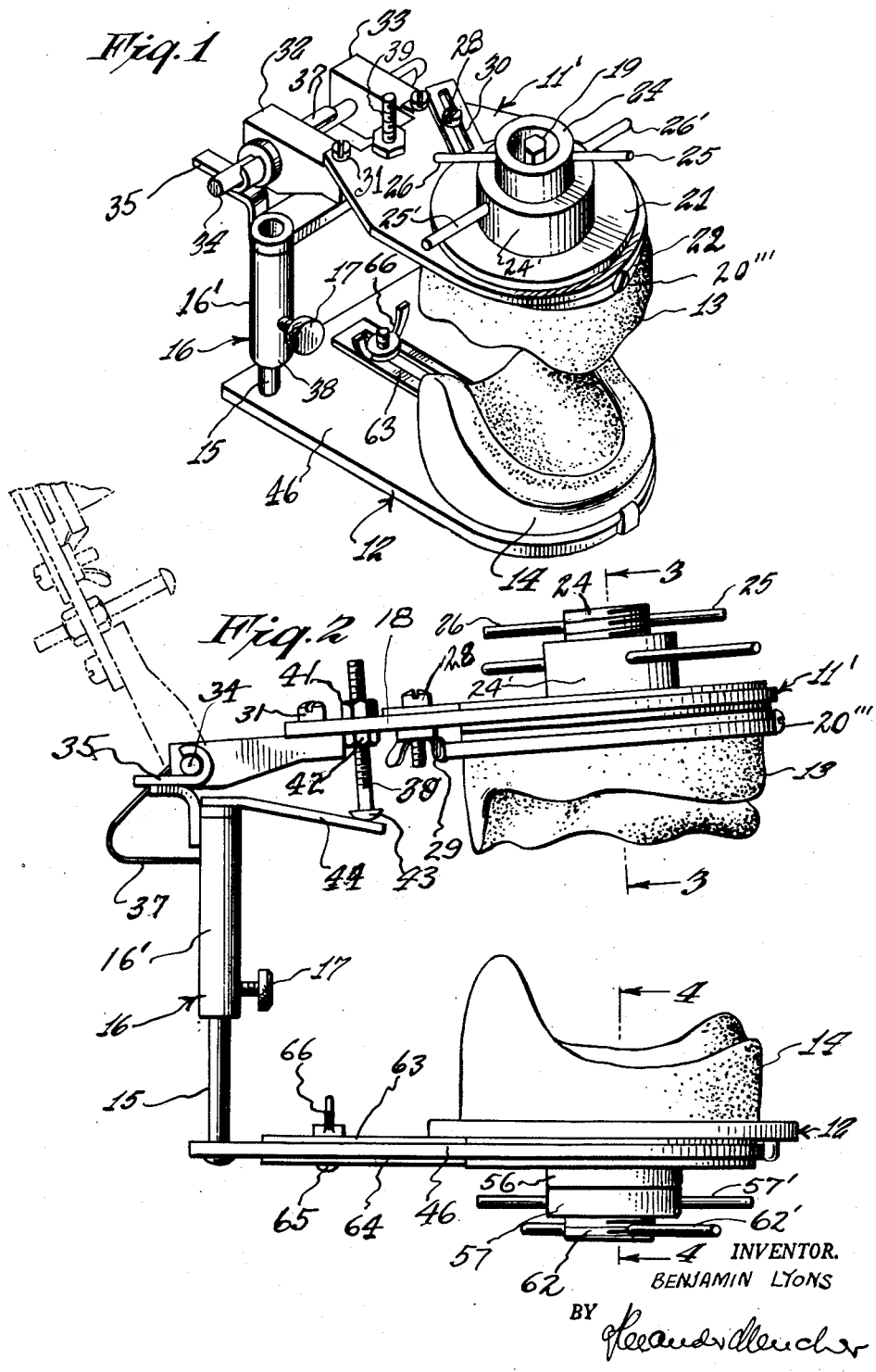

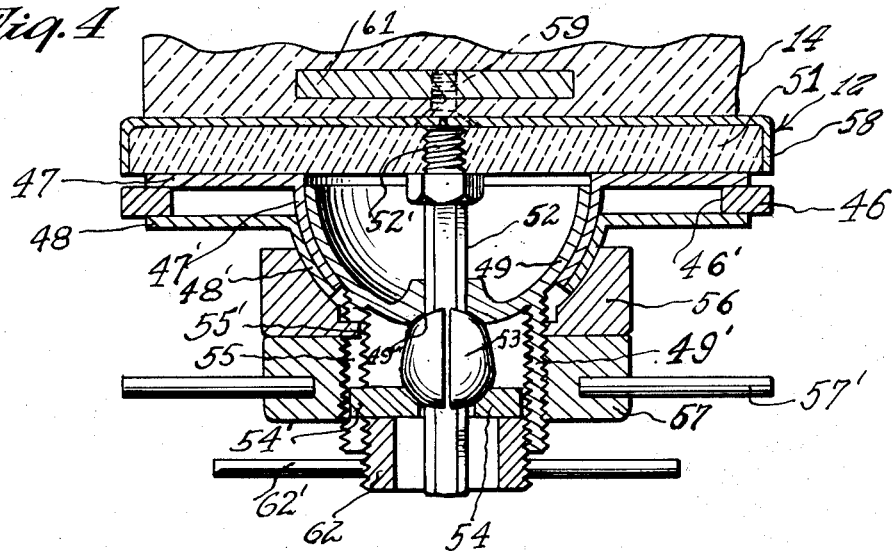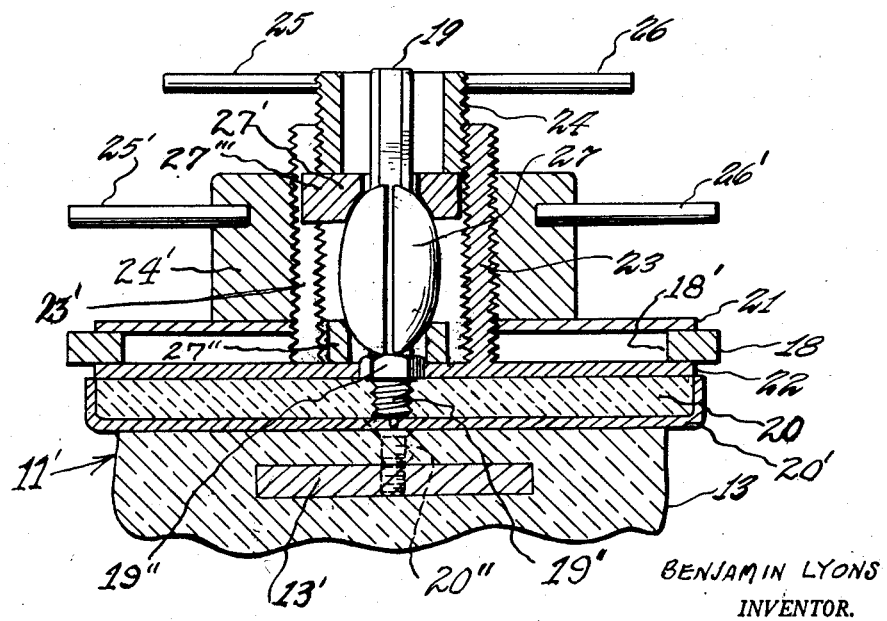

2,535,146

UNITED STATES PATENT OFFICE 2,535,146

DENTAL ARTICULATOR

Benjamin Lyons, Brooklyn, N. Y.

Application January 11, 1949, Serial No. 70,178

8 Claims. (Cl. 32—32)

This invention relates to dental articulators.

It is an object of the present invention to provide a dental articulator whereby an adjustment of the model carried upon either the upper or lower supports can be effected to correct the bite without the removal of the teeth models from the articulator supports.

It is another object of the invention to provide an articulator wherein both the upper and lower supports are so constructed as to permit the lateral adjustment alone in a horizontal plane of the model, the vertical adjustment of the model alone or the universal or tilting adjustment of the model sideways, fore and aft or a combination thereof.

It is another object of the present invention to provide an articulator wherein all the different movements of the jaws of the mouth can be simulated.

Other objects of the present invention are to provide an articulator capable of being adjusted to simulate all of the movements of the jaws which is of simple construction, easy to manipulate, inexpensive to manufacture, accurate and precise, compact and sturdy, and efficient in operation.

For a better understanding of the invention, reference may be had to the following detailed description taken in connection with the accompanying drawing, in which Fig. 1 is a perspective view of the dental articulator embodying the features of the present invention, Fig. 2 is a side elevational view thereof, Fig. 3 is an enlarged sectional view taken through the upper model support on line 3—3 of Fig. 2, Fig. 4 is an enlarged sectional view of the lower jaw model support taken on line 4—4 of Fig. 2, Fig. 5 is a perspective view of the socket rod clamps of the upper model support, Fig. 6 is a perspective view of the upper model supporting plate with the model thereon removed from the clamp parts, Fig. 7 is a fragmentary detailed sectional view taken on line 7—7 of Fig. 6 showing how the model retainer is connected to the upper supporting plate, Fig. 8 is a perspective view of the model and the retaining plate removed from the supporting plate, Fig. 9 is a perspective view of the model alone free of its retaining plate, Fig. 10 is a fragmentary perspective view of the bottom model assembly.

Fig. 11 is a perspective and collective view of the socket and rod clamp parts of the lower support assembly.

Referring now to the figures, 11' represents an upper model support assembly and 12 represents the base or lower model support assembly. On the upper support assembly 11' there is secured in a manner to be related, upper jaw model 13 while on the lower support assembly 12 there is secured, in the manner to be related, lower jaw model 14. The base or lower jaw assembly 12 has upward extending pins 15 on which a frame 16 including sleeves 16' is mounted for supporting the upper support assembly 11' at different vertically adjusted positions. Hand set screws 17 in the sleeves 16' fix the frame 16 to the upper support assembly in any of their vertically adjusted positions.

The upper support 11' has a main plate 18 with a large opening 18' therein. A shaft 19 of hexagonal section is vertically adjustable through opening 18' in the main plate 18 and is secured by a threaded end 19' and stop shoulder 19" onto a drop supporting plate 20, Figs. 3 and 6, onto which is horizontally slid a model retaining plate 20' to which model 13 is attached by screw 20". The retaining plate with the model 13 is slid horizontally onto the supporting plate 20 and is held against inward displacement by a screw lock 20''', Figs 6 and 7.

Onto respective top and bottom faces of the main plate 18 are upper and lower clamping plates 21 and 22. These plates lie over the opening 18' of the main plate and when loose can be laterally shifted to horizontally position the plates and the jaw model 13 in a manner to be presently described. The lower clamping plate 22 has an internally and externally threaded upstanding sleeve projection fixed thereto and extending upwardly through the opening 18' and through the clamping plate 21. A threaded clamping screw 24 is fitted into the upstanding sleeve 23 for vertical adjustment. This clamping screw 24 has arms 25 and 26 for effecting the turning thereof in the upstanding sleeve 23. The clamping plates 21 and 22 are held against the upper and lower faces of the main plate 18 by a clamping nut 24' threaded from the external threads of the sleeve projection 23 and has arms 25' and 26' for effecting the turning thereof. With the clamping nut 24' tightened upon the sleeve 23 the clamping plates are held in their horizontally adjusted positions on the main plate 18.

It can thus be seen that merely loosening the clamping nut 24' the jaw model 13 can be adjusted upon the main plate 18 to any desired horizontal location and thereafter upon tightening the clamping nut 24' it can be fixed in this horizontal location.

Surrounding the vertically extending rod 19 are opposing lock elements 27 adapted to laterally engage the rod to retain the rod and the supporting plate 20 raised to the clamping plate 22 or any position dropped therefrom. These opposing lock elements 27 are vertically elongated and of elliptical shape so that when top and bottom sockets 27' and 27'' are drawn together upon the lower clamping plate 22 with clamping screw 24 the rod 19 and the parts supported thereon will be positively locked against universal adjustment. The socket 27' has projection 27''' cooperating with a vertically extending slot 23' in threaded sleeve projection 23 to prevent its rotational displacement with respect thereto. These sockets have openings sufficiently large to permit a limited tilting adjustment of the rod and the parts connected thereto whereby the jaw model 13 can be tilted with respect to the main plate 18 upon the supporting plate 20 being dropped from the clamping plate 22. By having the opposing lock elements 27 elongated and generally of elliptical contour they will not shift after clamping screw 24 is tightened for angular adjustment of model 13. Such angular adjustment may take place after nut 24' is in tightened position.

The jaw model 13 is formed of moldable material about a plastic insert 13' into which fastening screws 20'' are extended upon securing the jaw model 13 to retaining plate 20'.

The clamping plates 21 and 22 are secured to the main plate 18 independently of the clamping nut 24' by a screw 28 and a wing nut 29 extending through slotted arm projections 30 of the clamping plates 21 and 22 and the main plate 18.

To the main plate 18 there is connected by fastening screws 31, laterally spaced arms 32 and 33 having a horizontally extending pivot shaft 34 fixed thereto. The ends of this pivot shaft removably rest upon hinged brackets 35 whereby to permit the upper jaw support assembly to pivot upward free of the lower assembly in the manner as indicated with dot dash lines in Figure 2. A spring 37 secured to the frame 16 and engaging with the horizontally extending shaft 34 releasably retains the upper assembly on the shaft brackets 35.

An adjustable screw 39 is extended vertically through the plate 18 and is locked in vertically extending position by lock nuts 41 and 42. This screw has a head 43 adapted to come to rest upon an inwardly extending stop plate 44 on the frame 16 whereby to support the upper jaw model 13 over the lower jaw model 14.

The lower support assembly 12 comprises a main plate 46 having a large central opening 46', Figure 4. Secured to the respective top and bottom faces of the main plate 46 are upper and lower clamping plates 47 and 48. The clamping plate 47 has a depending socket portion 47' fitting a depending socket portion 48' of the clamping plate 48. These socket portions when fitted together form a socket for semi-spherical member 49 which has a depending externally and internally threaded sleeve projection 49' thereon to hold the plates against relative lateral displacement and to hold member 49 against tilting when locked.

A supporting plate 51 has a depending rod 52 fixed to the same by its threaded end 52'. This rod extends downwardly through the semi-spherical member 49 and through opposing rod locking elements 53. These locking elements are not of true ball shape but have upper and lower rounded ends adapted to fit recess 49'' in the lower end of the semi-spherical member 49 and a similar but larger recess in a socket pate 54 having a projection 54' slidable in a slot 55 of the sleeve projection 49'.

Under the socket portion 48' is an annular member 56 recessed to receive the portion 48' and having a projection 55' extending inwardly into the slot 55 of the sleeve projection 49' to prevent rotational displacement of the member 56 relative thereto. A clamping nut 57 having arms 57' thereon can be tightened against the member 56 upon the threaded projection 49' to retain the cup shape member in any one of its tilted positions in the clamping plate socket portions. The tilting of the member 49 is permitted when clamping nut 57 is loosened and then tightened to any desired tilt. This permits a horizontal, lateral and tilting adjustment of the jaw model 14 when secured to the supporting plate 51 by its retaining plate 58 as by means of fastening screws 59 entering plastic insert 61 in the molded jaw model 14.

The locking elements for the rod 52 are clamped about rod 52 upon adjusting clamping screw 62 in the sleeve projection to cause the socket plate 54 to be brought tight upon the lower ends of the locking element 53. This may take place after clamping nut 57 has been tightened. This locks rod 52 in any up or down or vertical position. By tightening screw 62 such position is made rigid because of the shape of locking elements 53. The clamping plates 47 and 48 respectively have slotted arms 63 and 64 by which the plates can be fixed against horizontal displacement on the main part 46 by a bolt 65 and a wing nut 66.

The retaining plate 58 of the jaw model 14 is held on the supporting plate 51 against outward displacement by a thumb screw 67, Figure 10.

It should now be apparent that there has been provided a dental articulator whereby the upper and lower jaw model supports can be adjusted vertically alone, horizontally alone, and universally. There is no movement of the jaws of the mouth which cannot be duplicated by this articulator. The clamping parts are so constructed and arranged that free adjustment of the various supporting parts can be easily and readily had as the clamping parts are loosened.

Conventional supports can be used with either one of the above described supports and the upper and lower supports can be reversed upon the articulator if desired.

While various changes may be made in the detail description, it shall be understood that such changes shall be within the spirit and scope of the present invention as defined by the appended claims.

What is claimed is:

1. A dental articulator comprising upper and lower jaw model supports, a frame connecting said supports together, means for hingedly connecting the upper support to said frame, one of said supports comprising a main plate with a large opening therein, clamping plates disposed on the opposite sides of said opening and adjustably movable thereover, a threaded shank extending from one of said clamping plates through the main plate opening and through the other clamping plate, and a clamping nut connected to said shank to releasably secure the clamping plates to the main plate in any of their horizontal adjusted positions thereover, a supporting plate, a jaw model having a retainer plate releasably secured to said supporting plate, a rod adjustable through the clamping plates and the shank of the one clamping plate, said rod being of polygonal section, separable lock elements having rounded top and bottom external surfaces and adapted to grip the rod, socket means engageable with said surfaces from above and below and a clamping element operable within said shank for bringing said socket means into engagement with the lock elements.

2. A dental articulator as defined in claim 1, and said lock elements being vertically elongated, said socket means comprising top and bottom socket elements one of said elements having a lateral projection, said shank having a vertically extending slot receiving said lateral extending projection of the socket elements to prevent rotation relative thereto.

3. A dental articulator as defined in claim 1, and said shank on the clamping plate comprising an internally and externally threaded sleeve projection, said clamping element for the clamping plates comprising a nut threadedly engageable with the external threads of the sleeve projection, and said clamping element for the socket means comprising a screw threadedly connected to the internal threads of the sleeve projection.

4. A dental articulator as defined in claim 1, and each of said clamping plates having laterally extending slotted anchor arms, and a clamping bolt extending through the respective arms of the clamping plates and the main plate to secure the clamping plates upon the main plate against rotational displacement.

5. A dental articulator as defined in claim 1, and said shank of the clamping plate comprising a socket portion, a semi-spherical member fitted in the socket portion for universal adjustment therein, said semi-spherical member including a socket means for receiving certain of the external surfaces of the locking elements.

6. A dental articulator comprising upper and lower jaw model supports, a frame connecting said supports together, means for hingedly connecting the upper support to said frame, one of said supports comprising a main plate with a large opening therein, clamping plates disposed on the opposite sides of said opening and adjustably movable thereover, shank means extending from one of said clamping plates through the main plate opening and through the other clamping plate, and a clamping nut connected to said shank means to releasably secure the clamping plates to the main plate in any of their horizontal adjusted positions thereover, a supporting plate, a jaw model having a retainer plate releasably secured to said supporting plate, a rod adjustable through the clamping plates and the shank means of the one clamping plate, said rod being of polygonal section, separable lock elements having rounded top and bottom external surfaces and adapted to grip the rod, socket means engageable with said surfaces from above and below and a clamping element operable upon said clamping plate shank means for bringing said socket means into engagement with the lock elements, said shank means of the clamping plate comprising a socket portion, a semi-spherical member fitted in the socket portion for universal adjustment therein, said semi-spherical member including part of said socket means for receiving certain of the external surfaces of the locking elements, and the other clamping plate having a socket portion receiving the socket portion of the one clamping plate and said semi-spherical member carrying said shank, the shank having an internally and externally threaded sleeve projection, a socket ring surrounding the projection and engageable with a clamping plate socket portion, said clamping nut being connected to the external threads of the sleeve projection and engaging with the socket ring, said socket means for the lock elements further including a socket plate engageable with the other surfaces of the lock elements, and a clamping screw engageable with the socket plate and the internal threads of said sleeve projection.

7. A dental articulator comprising upper and lower jaw model supports, a frame connecting said supports together, means for hingedly connecting the upper support to said frame, one of said supports comprising a main plate with a large opening therein, clamping plates disposed on the opposite sides of said opening and adjustable shank thereover, means extending from one of said clamping plates through the main plate opening and through the other clamping plate, and a clamping nut connected to said shank means to releasably secure the clamping plates to the main plate in any of their horizontal adjusted positions thereover, a supporting plate, a jaw model having a retainer plate releasably secured to said supporting plate, a rod adjustable through the clamping plates and the shank means of the one clamping plate, said rod being of polygonal section, separable lock elements having rounded top and bottom external surfaces and adapted to grip the rod, socket means engageable with said surfaces from above and below and a clamping element operable upon said clamping plate shank means for bringing said socket means into engagement with the lock elements, said shank means of the clamping plate comprising a socket portion, a semi-spherical member fitted in the socket portion for universal adjustment, said semi-spherical member including part of said socket means for receiving certain of the external surfaces of the locking elements, and the other clamping plate having a socket portion receiving the socket portion of the one clamping plate and said semi-spherical member carrying said shank, the shank having an internally and externally threaded sleeve projection, a socket ring surrounding the projection and engageable with a clamping plate socket portion, said clamping nut being connected to the external threads of the sleeve projection and engaging with the socket ring, said socket means for the lock elements further including a socket plate engageable with the other surfaces of the locking elements, and a clamping screw engageable with the socket plate and the internal threads of said sleeve projection, and said sleeve projection having a vertically-extending slot, said socket ring having a radially inwardly extending projection entering said slot to be retained against rotational displacement upon the sleeve projection, and said socket plate for the lock elements having a radially extending projection entering the slot of the sleeve projection whereby to retain the socket element against rotational displacement.

8. A dental articulator comprising upper and lower jaw model supports, a frame connecting said supports together, means for hingedly connecting the upper support to said frame, one of said supports comprising a main plate with a large opening therein, clamping plates disposed on the opposite sides of said opening and adjustably extendable thereover, means extending from one of said clamping plates through the main plate opening and through the other clamping plate, and a clamping nut connected to said extending means to releasably secure the clamping plates to the main plate in any of their horizontal adjusted positions thereover, a supporting plate, a jaw model having a retainer plate releasably secured to said supporting plate, a rod adjustable through the clamping plates and the extending means of the one clamping plate, said rod being of polygonal section, separable lock elements having rounded top and bottom external surfaces and adapted to grip the rod, socket means engageable with said surfaces from above and below and a clamping element operable upon said clamping plate extending means for bringing said socket means into engagement with the lock elements, and said other jaw model supports comprising a main plate having a large opening therein, clamping plates disposable at the opposite surfaces of the main plate and having respectively interfitting socket portions, a semi-spherical member adjustable in said socket portions and having an internally and externally threaded sleeve projection thereon, clamping nut means securable to the sleeve projection and engageable with the socket portions of the clamping plates whereby to secure the clamping plates to the main plate, a supporting plate having a rod of polygonal section extending through the clamping plates and through the semi-spherical member, a jaw model releasably fitted upon the supporting plate, a socket element adjustable in the sleeve projection, separable locking elements on the opposite sides of the rod and adapted to have gripping engagement therewith, said separable locking elements having rounded surfaces, said semi-spherical member having surfaces for receiving the rounded surfaces of the locking element, and a clamping screw engageable with other surfaces of the locking element to bring the locking elements into gripping relation with the rod.

BENJAMIN LYONS.

REFERENCES CITED

The following references are of record in the file of this patent:

UNITED STATES PATENTS

| Number | Name | Date |
|---|---|---|
| 2,070,025 | Phillips | Feb. 9, 1937 |